United States Patent [19]

Biscomb

[11] 4,285,481
[45] Aug. 25, 1981

[54] MULTIPLE WIND TURBINE TETHERED AIRFOIL WIND ENERGY CONVERSION SYSTEM

[76] Inventor: Lloyd I. Biscomb, 4452 Burlington Pl., N.W., Washington, D.C. 20016

[21] Appl. No.: 101,492

[22] Filed: Dec. 7, 1979

Related U.S. Application Data

[63] Continuation-in-part of Ser. No. 44,934, Jun. 4, 1979.

[51] Int. Cl.³ .................. B64B 1/02; B64B 1/50; F03D 9/00
[52] U.S. Cl. .................. 244/33; 244/153 R; 290/55; 415/2 A; 415/7; 416/85
[58] Field of Search .................. 244/33, 58, 153 R; 290/43, 44, 54, 55; 415/2, 3, 7; 416/9, 84, 85, 86

[56] References Cited

U.S. PATENT DOCUMENTS

| 3,924,827 | 12/1975 | Lois | 244/153 R |
|---|---|---|---|
| 4,021,135 | 5/1977 | Pedersen et al. | 290/55 |
| 4,073,516 | 2/1978 | Kling | 244/33 |
| 4,166,596 | 9/1979 | Mouton et al. | 244/33 |

FOREIGN PATENT DOCUMENTS

| 830628 | 1/1952 | Fed. Rep. of Germany | 244/33 |
|---|---|---|---|
| 2720339 | 12/1978 | Fed. Rep. of Germany | 415/2 A |
| 518068 | 2/1940 | United Kingdom | 244/33 |

Primary Examiner—Charles E. Frankfort
Attorney, Agent, or Firm—Cushman, Darby & Cushman

[57] ABSTRACT

A plurality of wind turbines are supported aloft on the same tethered airfoil which is provided with devices for orienting the wind turbines into the wind. Various ways and devices are described for converting the wind energy into electrical power and for connecting and providing the plural outputs to the same electrical power grid. The principles are applicable whether there are a small number of relatively large wind turbines, a large number of relatively small wind turbines or some of each.

32 Claims, 7 Drawing Figures

MULTIPLE WIND TURBINE TETHERED AIRFOIL WIND ENERGY CONVERSION SYSTEM

REFERENCE TO RELATED APPLICATION

This is a continuation-in-part of my copending U.S. patent application Ser. No. 44,934, filed June 4, 1979 entitled Tethered Airfoil Wind Energy Conversion System, the contents of which are incorporated by reference herein.

BACKGROUND OF THE INVENTION

The aforementioned copending application discloses several variations of a device for converting wind power to electricity, using a wind turbine supported aloft on a specially-designed tethered airfoil. The device includes means for orienting the wind turbine optimally into the wind without requiring rotation of the tethered airfoil. Among the variations set forth are a first embodiment in which the wind turbine is supported on the tethered airfoil via a 3-armed frame and a second embodiment in which the wind turbine is supported on the tethered airfoil via a radially inner and a radially outer support ring, with a plurality of radiating spokes held in tension between them. Of these the second appears to be most economical. In addition, the outer ring provides a rigid leading edge for the airfoil, which may be essential for use in winds above a light breeze. The outer ring also provides a support for the leading and trailing edge flaps of the airfoil.

SUMMARY OF THE PRESENT INVENTION

A plurality of wind turbines are supported aloft on the same tethered airfoil which is provided with means for orienting the wind turbines into the wind. Various ways and means are described for converting the wind energy into electrical power and for connecting and providing the plural outputs to the same electrical power grid. The principles are applicable whether there are a small number of relatively large wind turbines, a large number of relatively small wind turbines or some of each.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION

Figure 1:
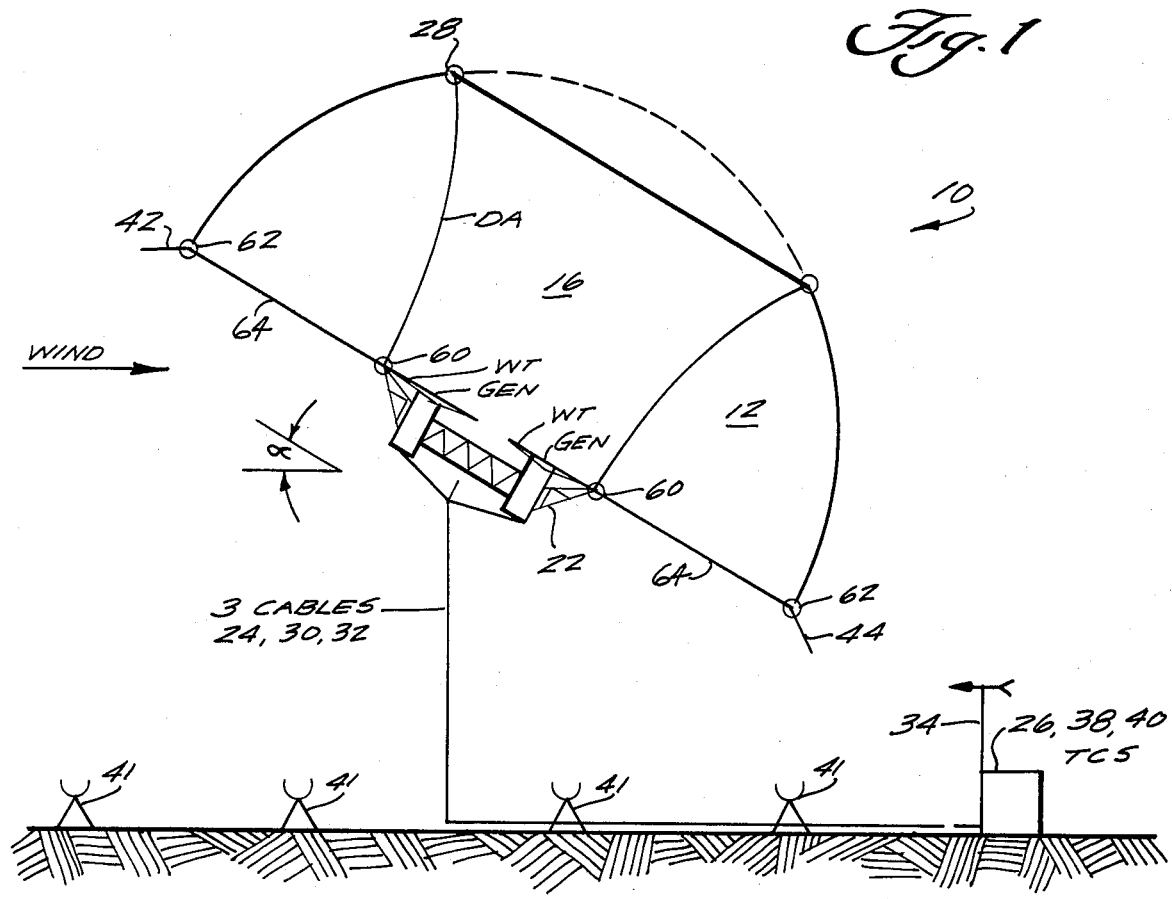
FIG. 1 is a simplified longitudinal vertical sectional view of a multiple wind turbine tethered airfoil wind energy conversion system, taken on line 1—1 of FIG. 3. In this version, the individual electrical cables all descend to the ground.
Figure 2:
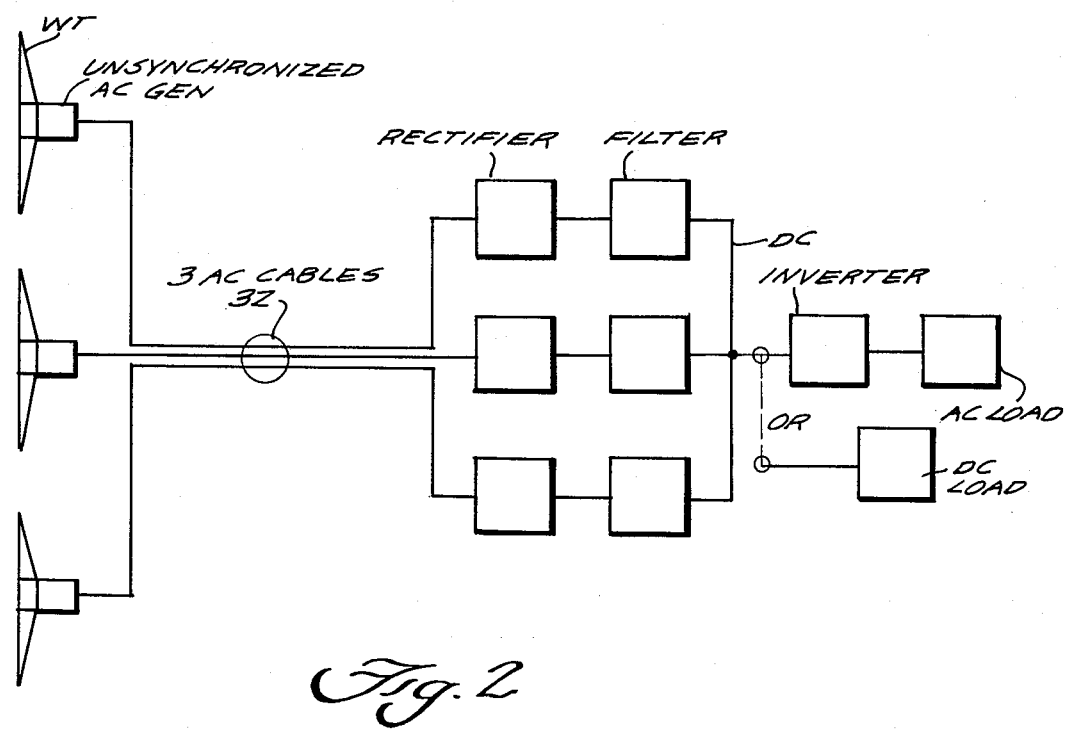
FIG. 2 is a schematic diagram of the apparatus of FIG. 1.
Figure 3:
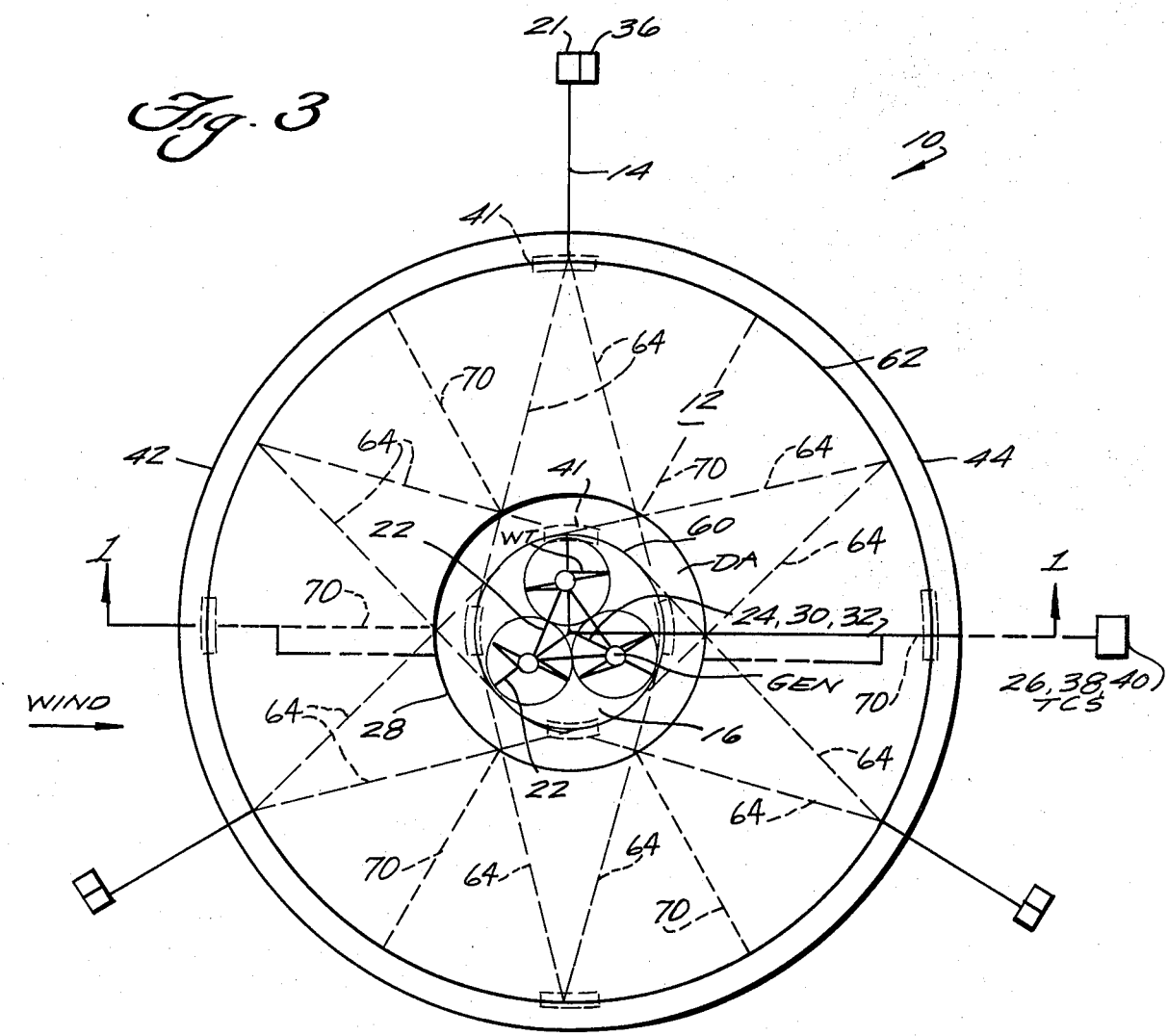
FIG. 3 is a simplified top plan view of the embodiment of FIG. 1.

In FIGS. 1–3 there is shown simply and schematically depicted a multiple wind turbine tethered airfoil wind energy conversion system (a MWT-TAWECS) 10.

In this embodiment, a gas bag three-dimensional body of revolution airfoil 12 shown as an approximately hemispherical shape for simplicity is filled with enough lighter-than-air gas, e.g., hydrogen to lift the TAWECS components and provide a moderate tension on the three tethers 14. Thus, the gas bag airfoil 12 is borne aloft with its rounded surface pointed generally upwards and its generally flat underside pointed generally downwards. Towards its geometric center and generally parallel to its longitudinal axis, the gas bag airfoil is provided with a tubular vent 16, having an upper end opening up through the rounded surface of the gas bag and a lower end opening down through the generally flat surface of the gas bag. At its lower end, the vent 16 has a plurality of wind turbines WT mounted so as to be rotated by the wind.

A preferred diffuser augmenter is shown at DA, being a specific configuration of the vent sidewall for augmenting the pressure drop across the wind turbines, in order to increase the power output and decrease the equipment cost per unit of power produced. In order to provide the diffuser augmenter, the radius of the vent is increased exponentially from bottom to top.

For the purpose of mounting the wind turbines at the bottom of the vent a framework is mounted to the airfoil by any convenient means. This framework preferably includes two metal rings 60, 62, made of shaped steel or aluminum (e.g. tubular), with spokes 64 in tension between them so that the outer ring 62 supports the inner ring 60 from the airfoil via the tensioned spokes 64. The outer ring 62 also supports flaps 42, 44 and the inner ring supports the frame structure 22 which supports the wind turbines WT and the electric generators GEN which are driven by the wind turbines. The gas bag may be connected to both rings 60, 62, e.g. by means of hold-down lines (not shown) or a net (not shown) extending over the gas bag.

The leading and trailing edge flaps 42, 44 act to increase the camber, coefficient of lift, and optimum angle of attack of the airfoil.

The gas bag, by being flexible, should prevent ice and snow buildup, by being free to deflect in six modes: roll, pitch, yaw, heave, sway and surge. Since gas bags may be of almost arbitrary size, it is likely that the size limitation is determined by the WT vanes, and 150-foot vanes are now under development by others. A hemispherical airfoil produces maximum camber/chord ratio, maximizing pressure drop across the WT's, and thus maximizes power produced.

Figure 4:
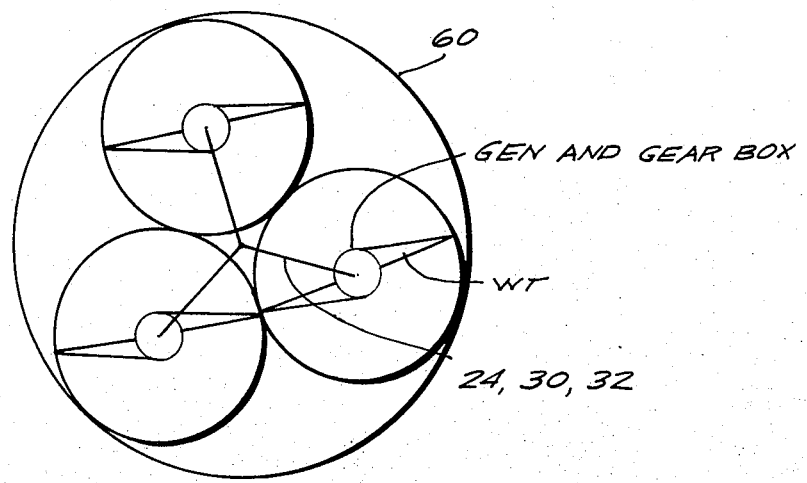
FIG. 4 is a simplified, fragmentary top plan view of a first variation, wherein the electrical outputs are combined before a common cable descends to the ground.
Figure 5:
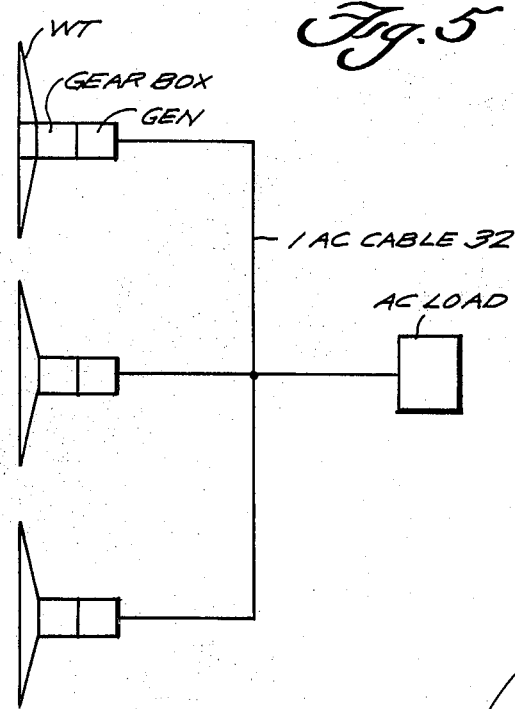
FIG. 5 is a schematic diagram of the apparatus of FIG. 4.
Figure 6:
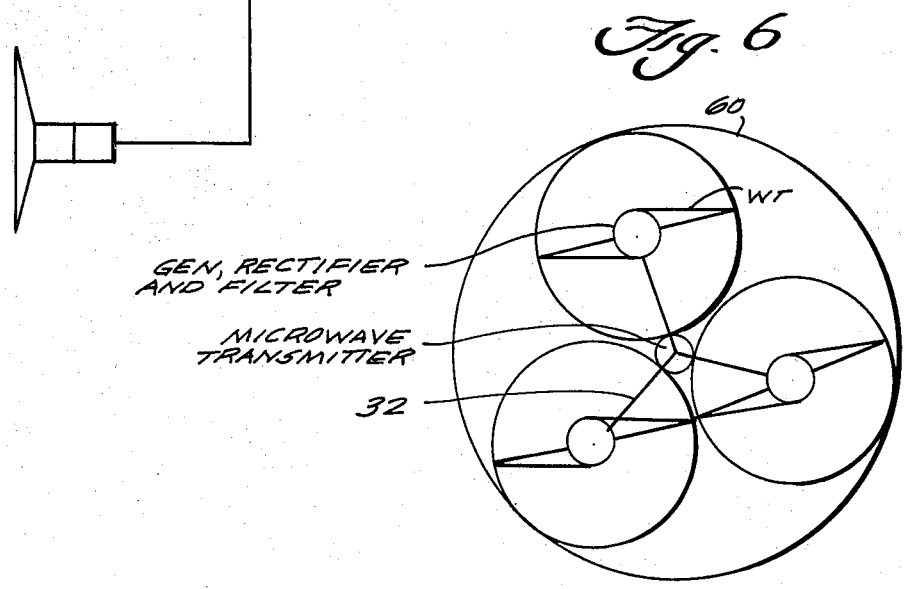
FIG. 6 is a simplified, fragmentary top plan view of a second variation, wherein the electrical outputs are beamed to the ground via a microwave transmitter/receiver set.
Figure 7:
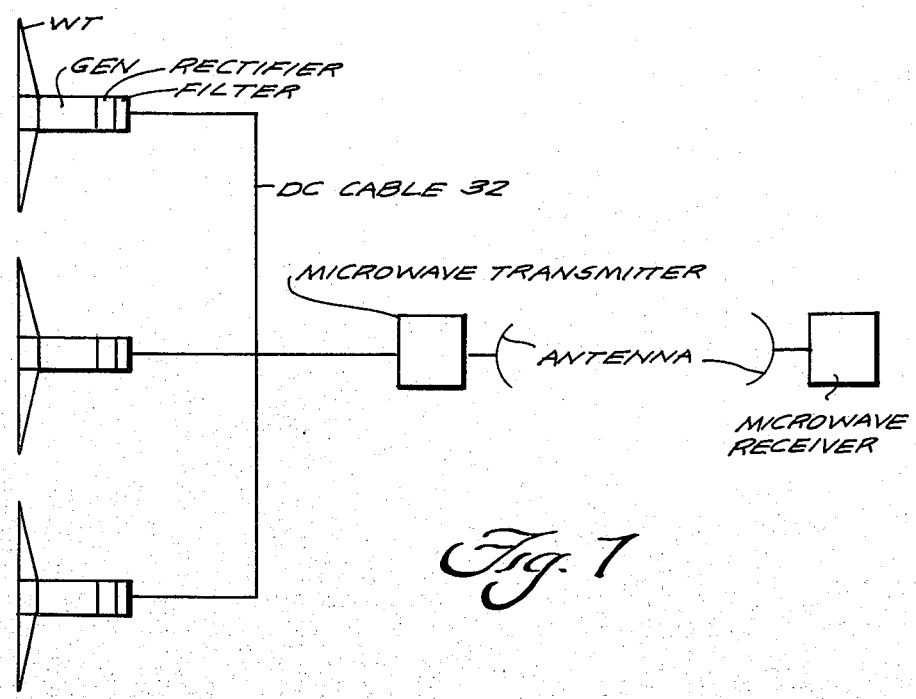
FIG. 7 is a schematic diagram of the apparatus of FIG. 6.

The hemispherical hydrogen-supported gas bag is tethered by three or more lines 14, which are adjusted by winches driven by motors 21 controlled by a tether control system TCS to control the tilt of the gas bag 12 into the wind, such that the angle of attack α is optimum up to at least 30° to maximize the pressure drop across the wind turbines WT. Each tether 14 ends at the outer ring 62, at a terminating point for spokes 64. In addition to those components already mentioned, at least one service line 24 is provided from the bottom of the electric generators GEN to the ground, and along the ground a distance greater than the radius of the gas bag, to provide hydrogen replenishment from a hydrogen generator 26 on the ground, power for aircraft warning lights, if required, control signals for hydrogen release valve 28 in the top of the gas bag, control signals for pitch control of the WT vanes, lightning ground cable 30 and a power output cable 32. In the version shown in FIGS. 1–3 there may be provided three service lines 24. In the version shown in FIGS. 4 and 5, the individual service lines combine aloft into one common line that extends down to the ground. In either version, each service line 24 may be led along one of the tether lines 14, instead of vertically to the ground. This will enable placing two or more MWT-TAWECS one above the other at particularly desirable (windy) sites. The power output cable of service line 24 may be replaced with a microwave transmitter in the TAWECS and a microwave receiver on the ground (as shown in FIGS. 6 and 7).

A wind direction indicator 34 is required on the ground to supply a wind direction-representing signal to the TCS, which calculates the required lengths of the respective tethers 14 to tilt the MWT-TAWECS into the wind at its optimum angle of attack $\alpha$ to maximize power output. Control signals are then sent to the three tether winch motor controllers 36 to set the individual tether lengths in accordance with these calculations. To this purpose the tether control system TCS may incorporate commercially available, inexpensive microprocessors, as explained in more detail in my aforesaid copending application.

For sites with a constant wind direction, the tether lines may be of predetermined fixed lengths to orient the airfoil into the wind at an optimum angle of attack. At such sites no winches would be required to lengthen and shorten the tether lines, no wind direction sensing means is required, and no tether control system is required. In such a case, the winches may be replaced with fixed tie-down means to anchor the tether lines, said tie-down means being disposed around the airfoil on the ground in any distributed configuration.

The hydrogen generator 26 may be one of several known types, which produce hydrogen by electrolysis of water (possibly obtained from condensed water vapor in the air), or by the process described by Pangborn, et al in U.S. Pat. No. 4,075,313, or by other means.

The hydrogen generators 26 must have a storage tank 38 and reserve capacity enough for a heavy snow or ice load accumulating during a period of no wind, to provide the extra lift required to keep the gas bag aloft with moderate tension on the tethers. The hydrogen generators may supply hydrogen not only to the airfoil, but elsewhere as an end product of the MWT-TAWECS. The hydrogen generators may be borne aloft by the airfoil. The tether control system TCS must sense tension on the tethers, and open the hydrogen supply valve 40 when tension becomes too low. The tether control system TCS must also sense excessive tension on the tethers, and open a release valve 28 in the top of the gas bag to release excess hydrogen to lower the tension on the tethers. The tether control system TCS must also provide for manual control of the tether winch motors for use in lowering the MWT-TAWECS for maintenance, which would require sufficient control to settle the framework including rings 60, 62 gently into a special cradle 41.

In lieu of electric generators GEN, the wind turbines WT may drive one or more flexible shafts (not shown) connected to a mechanical load (not shown) or respective mechanical loads (not shown) on the ground.

The gas bag should be constructed in sections of about 30° per section, or less, with each section being self-contained, to minimize damage and gas loss from one puncture. The section vertical sides 70 and bottoms may be black plastic or fabric, with transparent hemispherical section tops, to warm the hydrogen inside by solar radiation and greenhouse effect, and increase lift by decreasing the density of the hydrogen. The gas bag sections connect at the top center to a circular member such as a tube (not shown) which supports the hydrogen release valve, the aircraft warning lights, if required, and the lightning rods. The MWT-TAWECS is shown disposed over a flat terrain surface. It should be apparent that a hilltop site is included in the purview of the invention, even preferred, since wind velocity is generally greater at such sites.

The MWT-TAWECS could be assembled on a relatively flat terrain surface, inflated, and then moved to a relatively inaccessible site for installation, such as a hilltop, marsh, or over water by using one helicopter per tether.

To decrease the weight and cost of the generators connected to the wind turbines, synchro generators could be used, connected electrically to one or more synchro motors on the ground at some convenient distance away, each of which is then connected to a load (electrical or mechanical).

If the electrical outputs of the generators GEN of the individual wind turbines WT are to be integrated and supplied to a load (e.g. a common power grid) an electrical power integrating means is needed. Fortunately several such means are commercially available. In particular, (a) The generators GENs may be individual constant voltage DC generators parallel connected to the same power output cable (or to a DC load on the ground, such as a water hydrolysis hydrogen generator (not shown in detail)).

(b) Unsynchronized AC generators, which currently are cheaper than DC generators, may be connected in parallel through individual power output cables to rectifiers and filters located on the ground, and thence to either a DC load or, through an inverter, to an AC load.

(c) AC generators synchronized to the power grid frequency and connected through a common power output cable to the power grid. This requires the use of a gear box or the like between each wind turbine WT and the respective generator GEN that is associated therewith. Each gear box transforms the actual angular rotation output of the associated wind turbine WT to that required for the respective synchronized AC generator. The power output from each generator can then be fed through a common power output bus to the ground for voltage and current transformation, if necessary, and connection to the grid.

(d) A plurality of variable voltage DC generators connected through separate power output cables to separate DC loads on the ground, or to separate synchronous inverters on the ground, and thence to the power grid or the AC load.

All these electrical integration technologies are well known. A useful summary thereof is provided in the paper "Electrical Technology Overview and Research at Oklahoma State University as Applied to Wind Energy Systems", R. Ramakumar et al, published in Proceedings of the Second Workshop on Wind Energy Conversion Systems, F. R. Eldrige, editor, 1975, Mitre Corp. report RAN-75-0500.

Although the MWT-TAWECS 10 of FIGS. 1-3 is shown having three wind turbines WT, a greater or lesser number of similarly clustered wind turbines could be employed; for example, the number of wind turbines provided in the vent may be two, three, seven (e.g. six encircling one), or nineteen. My current preference is for three wind turbines WT as illustrated in FIGS. 1-3, and the use of generator option (c) explained hereinabove.

It should now be apparent that the present invention provides a multiple wind turbine tethered airfoil wind energy conversion system preferably incorporating the following features and advantages:

A flexible gas bag support which:

a. provides a maximum ratio of camber/chord, which produces a maximum pressure drop across the vent containing the wind turbines, thus maximizing the power produced by the wind turbines, b. provides a means of eliminating ice and snow buildup, c. allows wind turbines probably limited in size only by the wind turbine vanes, d. provides a diffuser augmenter above the wind turbines to further increase the pressure drop across the wind turbines, and e. provides a tether control system to keep the hemispheric gas bag airfoil oriented into the wind from any direction at an optimum angle of attack to maximize power output.

There are many forms of airfoils for aircraft applications employing reduced pressure on the suction side and increased pressure on the pressure side (as described in any aerodynamics text). A variety of gas bag shapes employing these basic principles may be used in place of the hemispherical form shown.

It should now be apparent that the multiple wind turbine tethered airfoil wind energy conversion system, as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A multiple wind turbine tethered airfoil wind energy conversion system, comprising:

a positive-lift, lighter-than-air, flexible gas bag-type airfoil provided with a lined vent which extends completely generally axially therethrough;

a plurality of wind energy conversion devices each having a power output-providing device;

frame means supported by said airfoil and mounting said wind energy conversion devices for rotation relative to said airfoil, each being axial aligned so as to be substantially parallel with said vent;

a plurality of motorized, individually operable winches, being at least three in number, and being for disposition at spaced sites generally in an imaginary ring on the ground;

each such winch having a tether line having a first end connected therewith and having a respective outer end;

means connecting each tether line outer end to said airfoil radially distally of said vent, so that said airfoil is tethered to said winches from a plurality of widely distributed sites;

a means for supplying inflating lighter-than-air gas to the airfoil, this means including a gas inlet control valve;

a means for releasing inflating lighter-than-air gas from within the airfoil, this means including a gas release control valve;

means for sensing wind direction incident upon said airfoil and for providing an output signal in relation thereto;

a tether control system incorporating means for determining for each of a plurality of various different wind direction-related output signals received from said sensing means, respective control signals equating to the amounts by which each of the respective tether lines must be reeled in or payed out in order to tilt the airfoil into the wind at an optimum angle of attack to maximize power output of said power output-providing devices of said wind energy conversion devices;

means operatively connecting said sensing means to said tether control system for furnishing said output signal to said tether control system; and means operatively connecting said tether control system to each of said motorized, independently operable winches for furnishing said respective control signals to the respective said winches.

2. The multiple wind turbine tethered airfoil wind energy conversion system of claim 1, wherein:

the airfoil is of generally hemispherical shape, base generally downwards, with each wind energy conversion device being constituted by a respective wind turbine mounted generally at the lower end of said vent.

3. The multiple wind turbine tethered airfoil wind energy conversion system of claim 2, wherein:

each power output-providing device comprises a rotary-driven electrical generator operatively coupled to a respective said wind turbine.

4. The multiple wind turbine tethered airfoil wind energy conversion system of claim 3, wherein:

said electrical generator is supported aloft by said airfoil.

5. The multiple wind turbine tethered airfoil wind energy conversion system of claim 4, further comprising:

a respective service line connected with each said electrical generator and extending therefrom for taking off electrical power generated by operation of said electrical generator.

6. The multiple wind turbine tethered airfoil wind energy conversion system of claim 5, wherein:

each service line extends to the ground along one of said tether lines.

7. The multiple wind turbine tethered airfoil wind energy conversion system of claim 3, further comprising:

means for integrating the outputs of all of said generators and for providing the resulting output to an electrical distribution grid.

8. The multiple wind turbine tethered airfoil wind energy conversion system of claim 4, further comprising:
   means for transmitting electrical power generated by operation of said electrical generators to remotely of said electrical generators.

9. The multiple wind turbine tethered airfoil wind energy conversion system of claim 8, wherein:
   said transmitting means is constituted by at least one microwave transmitter supported by said airfoil and at least one microwave receiver located on the ground.

10. The multiple wind turbine tethered airfoil wind energy conversion system of claim 2, wherein:
    said frame means comprises a structure extending from said wind turbines to the base of said lined vent, a ring having said structure joined thereto at the base of said lined vent; an outer ring extending around the outer periphery of the airfoil; and a plurality of tensioned mechanical tie means interconnecting the inner and outer rings at a plurality of angularly spaced points.

11. The multiple wind turbine tethered airfoil wind energy conversion system of claim 1, further including flap means skirting said airfoil at the base thereof.

12. The multiple wind turbine tethered airfoil wind energy conversion system of claim 1, wherein:
    said tether control system operates in use to tilt said airfoil at an angle $\alpha$ of up to about 30° from horizontal, headed into the wind.

13. The multiple wind turbine tethered airfoil wind energy conversion system of claim 1, wherein:
    said lined vent increases exponentially in radius from bottom to top in order to provide a diffuser augmenter.

14. The multiple wind turbine tethered airfoil wind energy conversion system of claim 1, wherein:
    said means for supplying inflating lighter-than-air gas to the airfoil includes a gas generator.

15. The multiple wind turbine tethered airfoil wind energy conversion system of claim 14 wherein said gas generator is a hydrogen generator.

16. The multiple wind turbine tethered airfoil wind energy conversion system of claim 15, wherein:
    said hydrogen generator is borne aloft by said airfoil.

17. The multiple wind turbine tethered airfoil wind energy conversion system of claim 15, wherein:
    said hydrogen generator constitutes at least part of said power output-providing device by having a capacity, when in use, to provide substantially more hydrogen, as an output product, than is required for providing inflating gas for said airfoil; and means for taking off excess hydrogen from said hydrogen generator as an output product.

18. The multiple wind turbine tethered airfoil wind energy conversion system of claim 1, further including:
    means communicated to said tether lines, said tether control system, and said control valves, for sensing the tension on said tether lines and for admitting inflating gas to said airfoil and for releasing inflating gas from said airfoil for maintaining said tension within a preselected range.

19. The multiple wind turbine tethered airfoil wind energy conversion system of claim 1, wherein:
    each power output-providing device comprises a respective rotary shaft.

20. The multiple wind turbine tethered airfoil wind energy conversion system of claim 19, wherein:
    each said rotary shaft is flexible.

21. The multiple wind turbine tethered airfoil wind energy conversion system of claim 1, wherein:
    said airfoil is internally divided into a plurality of individual compartments by internal wall means, in order to prevent one puncture from causing catastropic loss of inflating gas from said airfoil.

22. The multiple wind turbine tethered airfoil wind energy conversion system of claim 21, wherein:
    said internal wall means comprise a plurality of internal walls of flexible sheet extending perpendicularly to said base and radially of said vent at about 30° intervals.

23. The multiple wind turbine tethered airfoil wind energy conversion system of claim 22, wherein:
    said base and said internal walls are relatively dark-colored and wherein the remainder of said airfoil is relatively transparent for enhancing warming by solar radiation of inflating gas contained in said airfoil.

24. The multiple wind turbine tethered airfoil wind energy conversion system of claim 1, further comprising:
    a cradle disposed on the ground beneath said airfoil; and
    means for guidingly lowering said airfoil down onto said cradle to a non-use position thereon.

25. A multiple wind turbine tethered airfoil wind energy conversion system, comprising:
    a plurality of wind turbines each having a power output-providing device for providing a power output as that wind turbine is rotated by the wind;
    a generally toric, lighter-than-air gas-filled airfoil having a generally hemispherical outer, upper side and a generally flat inner, lower side, with a generally central, lined vent passageway communicating generally axially between said sides so as to have an entrance through said lower side and an exit through said upper side;
    means for mounting each wind turbine with axes parallel to said vent adjacent said vent entrance;
    a plurality of angularly widely distributed tether lines each attached to said airfoil distally of the longitudinal axis thereof;
    a plurality of ground-based tether line payout/takeup devices, each having a respective said tether line connected therewith, so that individual said devices may be operated to increase and decrease the lengths of the individual tether lines effectively in use, for tilting the wind turbine into the wind without need for rotating the airfoil.

26. A multiple wind turbine tethered airfoil wind energy conversion system comprising:
    a plurality of wind turbines each having a respective power output shaft means;
    frame means mounting the wind turbines for rotation about respective generally vertical, but tiltable axes;
    a buoyant-in-air gas bag airfoil means having said frame means mounted thereto for deploying the resulting wind turbines, frame means, gas bag means assembly above a datum surface;
    a plurality of tether lines each having an upper end secured to said assembly and a lower end extended down to adjacency with said datum surface;
    a separate means anchoring each said tether line lower end relative to said datum surface and including means for acting upon the respective tether line for effectively lengthening and shortening the distance between each respective tether line upper end and said datum surface;

control means connected to all of said effectively lengthening and shortening means and being operable to coordinately modify said distances by shortening at least one and/or lengthening at least another for selectively tilting said axis and thus heading the airfoil into the wind.

27. A method for deploying a plurality of wind turbines into the wind, comprising:

suspending all the wind turbines in mid-air above a datum surface by buoying all the wind turbines with a common lighter-than-air gas bag airfoil so that the respective wind turbine longitudinal axes are generally vertically oriented;

tethering the wind turbines down to the datum surface using a plurality of perimetrically widely distributed tether lines; and coordinately relatively lengthening and shortening said tether lines in order to incline the respective wind turbine longitudinal axes in the azimuthal direction and to the degree which maximizes wind energy conversion by said wind turbines to rotary output power.

28. A multiple wind energy conversion device tethered airfoil wind energy conversion system, comprising:

a positive-lift, lighter-than-air, flexible gas bag-type airfoil provided with a lined vent which extends completely therethrough;

a plurality of wind energy conversion devices, each comprising a means for accepting a wind energy mechanical input and providing a converted power output;

means mounting all said wind energy conversion devices on said airfoil for movement of portions thereof with respect thereto incident to accepting said input and providing said converted output, said wind energy conversion devices being disposed athwart said vent, so that at least some wind in order to transit said vent must impact said wind energy conversion devices;

a plurality of tether lines, being at least three in number, each having a first end effectively secured to the airfoil and a depending second end;

a respective anchor means associated with said second end of each tether line;

each tether line and respective anchor means associated therewith including means for effectively adjusting the length in use of the respective tether line for correspondingly adjusting the vector of tilting of said airfoil and thus adjusting the aiming of said vent, for regulating the acceptance of wind energy by said wind energy conversion device.

29. The multiple wind energy conversion device tethered airfoil wind energy conversion system of claim 28, wherein:

each of said wind energy conversion devices comprises a wind turbine and frame means mounting that wind turbine on the airfoil.

30. The multiple wind energy conversion device tethered airfoil wind energy conversion system of claim 29, wherein:

said frame means is constituted by a unitary frame for all of said wind energy conversion devices.

31. The multiple wind energy conversion device tethered airfoil wind energy conversion system of claim 28, wherein:

each of said wind energy conversion devices comprises an electrical generator for converting mechanical motion to electrical power.

32. The multiple wind energy conversion device tethered airfoil wind energy conversion system of claim 28, wherein:

said system further includes means for communicating said converted power output to a ground site off-board said airfoil.

* * * * *